United States Patent
Veras Bezerra de Silva et al.

(10) Patent No.: US 10,740,943 B1
(45) Date of Patent: Aug. 11, 2020

(54) SYSTEM AND METHOD FOR MODIFICATION OF AN ANIMATION EFFECT DURING CONTINUOUS RUN

(71) Applicant: Facebook, Inc., Menlo Park, CA (US)

(72) Inventors: Pedro Veras Bezerra de Silva, London (GB); Andrey Staroseltsev, London (GB); Tingyong Liu, London (GB); Shady Hassan Sayed Hassen Aly, London (GB); Alexander Nicholas Rozanski, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/201,949

(22) Filed: Nov. 27, 2018

(51) Int. Cl.
G06T 15/00 (2011.01)
G06T 13/20 (2011.01)
G06F 3/0484 (2013.01)
G06T 17/10 (2006.01)

(52) U.S. Cl.
CPC .......... *G06T 13/20* (2013.01); *G06F 3/04845* (2013.01); *G06T 17/10* (2013.01); *G06T 2213/08* (2013.01)

(58) Field of Classification Search
CPC ............ G06F 15/0225; G06B 19/0426; G06B 2219/23258; G06B 2219/32128
USPC ......................................................... 345/418
See application file for complete search history.

(56) References Cited

U.S. PATENT DOCUMENTS

| | | | |
|---|---|---|---|
| 7,680,546 B2 * | 3/2010 | Gilbert | G06Q 10/06 700/17 |
| 8,060,834 B2 * | 11/2011 | Lucas | G06F 9/451 715/771 |
| 8,316,313 B2 * | 11/2012 | Campney | G05B 19/0426 715/771 |
| 8,448,076 B2 * | 5/2013 | Hammack | G05B 19/0426 715/763 |
| 8,881,039 B2 * | 11/2014 | Hammack | G06T 3/0012 715/764 |
| 8,896,603 B2 * | 11/2014 | Hammack | G05B 19/0426 345/440 |
| 9,285,795 B2 * | 3/2016 | Nixon | G06F 9/4488 |

(Continued)

OTHER PUBLICATIONS

Monomarenko, Unreal Engine 3D Modeling: a Step-by-Step Guide, Gameface Creative Studio, Jan. 4, 2018, pp. 1-10.*

(Continued)

*Primary Examiner* — Phu K Nguyen
(74) *Attorney, Agent, or Firm* — Baker Botts L.L.P.

(57) ABSTRACT

One embodiment of the present disclosure presents a technique for enabling user modification of an animation effect, while the animation effect is being rendered. The technique includes generating an editor user interface, wherein the editor user interface that includes an editor module that includes an editor model and an engine model. In the technique the editor model includes an editor value corresponding to a bindable property. In addition, the engine model comprises an engine value corresponding to the bindable property. The technique also includes receiving user input corresponding to a modification of the editor value. The technique further includes modifying the editor value based on the user input. In addition, the technique includes synchronizing the modified editor value with the engine value and modifying an animation effect based on the synchronized engine value.

20 Claims, 7 Drawing Sheets

(56) References Cited

U.S. PATENT DOCUMENTS

| | | | | | |
|---|---|---|---|---|---|
| 9,501,208 | B2* | 11/2016 | Jundt | ................. | G05B 19/4188 |
| 9,513,780 | B2* | 12/2016 | Scott | .................. | G05B 19/4188 |
| 9,792,004 | B2* | 10/2017 | Hammack | .............. | G05B 15/02 |
| 9,830,299 | B2* | 11/2017 | Campney | ........... | G05B 19/0426 |
| 10,386,827 | B2* | 8/2019 | Enver | ................ | G05B 19/4184 |

OTHER PUBLICATIONS

Virtus Learning Hub/ Creative Tutorials, User Interface Development—Unreal Engine 4 Course , Jul. 3, 2018, https://www.youtube.com/playlist?list=PLL0cLF8gjBprlHm0yo-Vj9oBwi2-gAlEd.*

* cited by examiner

US 10,740,943 B1

SYSTEM AND METHOD FOR MODIFICATION OF AN ANIMATION EFFECT DURING CONTINUOUS RUN

TECHNICAL FIELD

This disclosure generally relates to animation systems, such as augmented reality (AR) animation systems.

BACKGROUND

Computer animations have seen widespread application across many fields, such as education, entertainment, and marketing. In particular, computer animations may be used to generate a visual perception of movement in a scene. For example, computer animations may be utilized for asset and object dynamics and for special effect generation and enhancement. With respect to asset and object dynamics, computer animations may be used to generate a visual perception of an asset speaking or an object moving. With respect to special effect generation and enhancement, computer animations may be used to generate visual effects, such as light effects, camera effects, and background animations.

In addition, computer animations have been used in conjunction with augmented reality (AR) systems. For example, AR systems may utilize computer animations in order to animate a virtual object displayed in an augmented reality scene. The computer animation may cause the virtual object to move and/or deform responsive to user behavior.

Furthermore, a software platform may be generated that provides animation designers with tools to generate and modify computer animations. In particular, a designer may define one or more objects in a scene, and may further define animation sequences for various virtual objects in the scene. After the designer finishes defining the AR scene, the designer may trigger the AR system to render the computer animation.

One drawback of AR systems is that a designer may not be able to modify the computer animation while the AR system is rendering the animation. Instead, the designer may be required to stop the computer animation and/or wait until the AR system finishes rendering the animation in order to modify the animation. Requiring designers to stop the computer animations and/or wait for computer animations to finish rendering in order to modify the animation adds latency to the design process. This latency may make the computer animation design process slow, tedious, and cumbersome.

SUMMARY OF PARTICULAR EMBODIMENTS

This disclosure relates to a technique for removing latency from the process of generating and modifying animation effects. In particular, the disclosure provides an animation system that receives user input and further modifies a displayed animation effect based on the user input, while rendering the animation effect. The disclosed animation system includes an editor module that generates an editor model of an animation effect and an engine module that generates an engine model of the animation effect. The engine model may be a version of the editor model that is suitable for execution by a backend (e.g., a central processing unit (CPU) and/or a graphics processing unit (GPU)).

In further embodiments, the editor module may generate one or more display modules for displaying an animation effect. In addition, the editor module may receive user input for defining and modifying the animation effect via the display modules. In various embodiments, animation effects may include one or more elements (e.g., objects, assets, and layers). Each element may be defined by one or more properties (e.g., a color property, a position property, a rotation property, etc.). Each property may be associated with a value (e.g., a color value, a position value, a rotation value, etc.). The editor module may implement user input to define properties of elements of the animation effect, and values associated with each property. For example, a position property may be associated with a user-defined element of the animation effect. The editor module may further associate a coordinate value with the position property based on user input.

The editor module may define and store editor property-value pairs in the editor model. Each property-value pair may correspond to one or more elements of an AR effect. In addition, the engine module may define and store engine property-value pairs that also corresponding to elements of the AR effect. When user input is received, the editor module may update a stored editor property-value pair. The editor module may further synchronize the updated editor property-value pair with a corresponding engine property-value pair stored in the engine model. When the backend processes the engine model, the backend utilizes the synchronized engine property-value pairs to generate the AR effect.

In various embodiments, one or more properties may be defined as bindable properties. Bindable properties may be associated with an editor value stored in the editor model and an engine value stored in the engine model. Bindable properties may further be designated as unbound or bound. While the animation effect is being executed by the animation system, unbound bindable properties may be modified by the user. In particular, responsive to user input, the editor module may modify an editor value of the unbound bindable property. However, bindable properties designated as bound may not be modified by the user. Instead, for bound bindable properties, the backend may utilize the engine value of the bound bindable property to generate processed animation property-value pairs. The engine module may further synchronize processed animation property-value pairs from the backend with runtime property-value pairs stored in the editor module. The editor module may utilize the display modules to update a displayed animation effect based on the synchronized runtime property-value pairs. Accordingly, the disclosed animation system may enable user modification of an animation effect, while the backend executes the animation effect.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
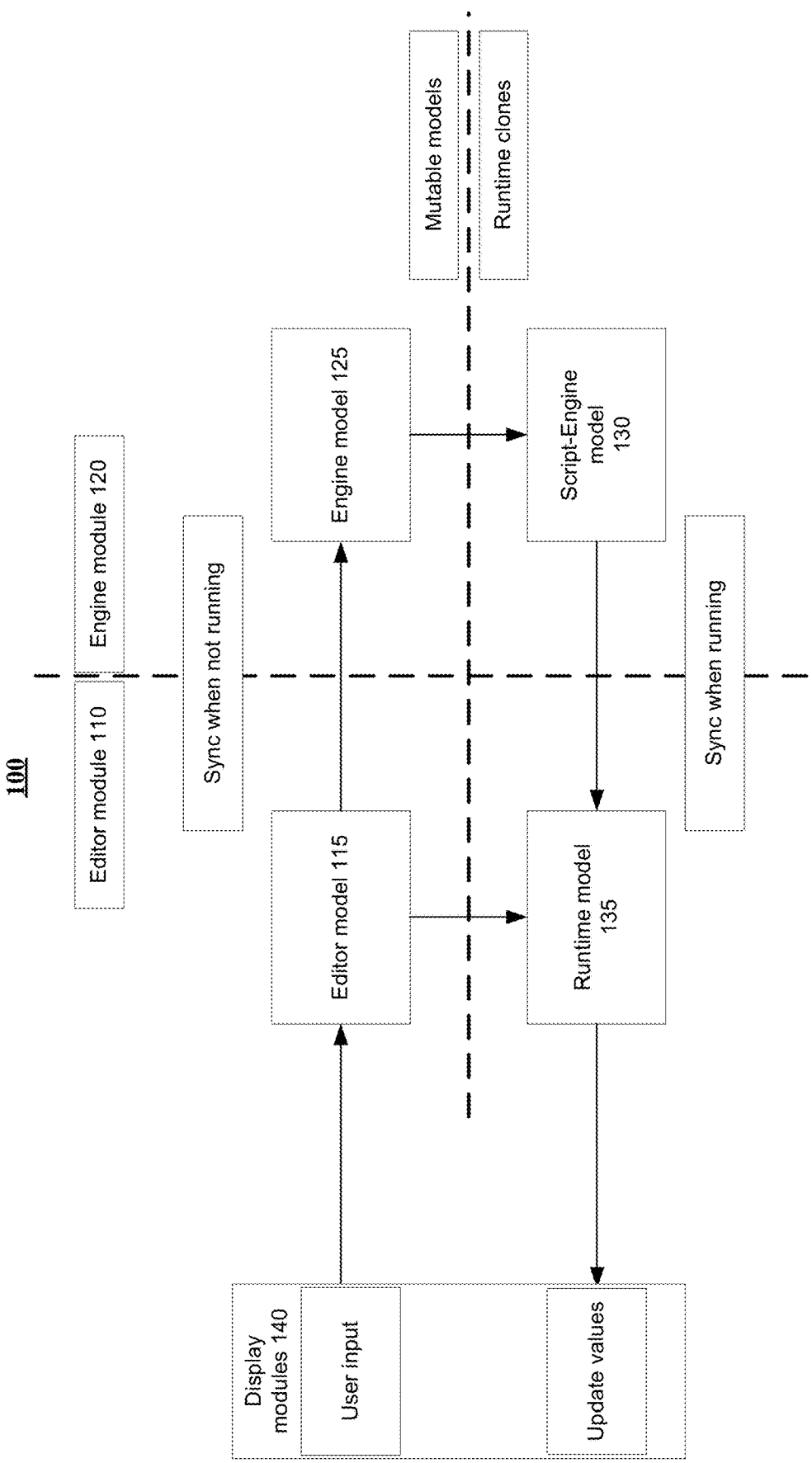
FIG. 1 illustrates an example animation system without continuous run, according to various embodiments.

In various embodiments, a client system may store an animation system. The animation system may include an editor module and an engine module. In particular, the editor module may generate one or more display modules for receiving user input. For example, the display modules may include, for example and not by way of limitation, a viewport module, a simulator module, an inspector module, a patch editor module, and a scripting module.

In particular, the viewport module may provide a display of an animation effect. In various embodiments, the viewport module may display one or more layers, such as, for example and not by way of limitation, a background layer, a color layer, a mask layer, and so forth. In addition, the viewport module may display one or more objects, such as a graphics object. The viewport module may also display a video playback and/or may display a real-time video feed. In addition, the simulator module may display a version of the viewport module as displayed on one or more devices types, such as, for example, and not by way of limitation, a mobile phone, a tablet, a smart watch, a smart display, and so forth.

Furthermore, each element of an animation effect may be defined by one or more properties. For example, an object may have a position property, a rotation property, a size property, and so forth. Each property may be associated with one or more values (e.g., a position value, a rotation value, a size value, etc.). The inspector module may display values associated with properties of various elements of the animation effect. In various embodiments, the inspector may enable user input to update displayed value. In particular, responsive to user input, the inspector module may pass an updated value to the editor module for updating a corresponding value of a property stored in the editor model. In addition, a manipulator module may also enable user modification of properties and corresponding values of elements of an animation effect.

Moreover, a patch editor module may enable users to associate properties with one or more elements of an animation effect. For example, responsive to user input, the editor module may link one or more properties of a first element of an animation effect with one or more properties of a second element. Accordingly, as a value of a property of the first element changes, a value of a property of a second element may also change. For example, responsive to user input, the patch editor may associate a position property of a first property with a color property of a background layer. Accordingly, as the color of the background layer changes, the position of the object may shift.

Furthermore, the scripting module may receive user-generated code that defines an animation effect. The scripting module may pass the user-generated code to the editor module. The editor module may parse and store the user-generated code in the editor model for synchronization with the editor model.

In various embodiments, the editor module may store a list of property-value pairs for each element in an animation effect. For example, the editor module may receive user input defining an object. In particular, the user input may identify one or more properties of the object and one or more values associated with each property. Additionally, the user input may also define a relationship between one or more properties of the object and one or more existing elements of the animation effect (i.e., a property-property relationship). The editor module may further store each property-value pair and each property-property relationship in the editor model.

In various embodiments, the editor module may synchronize editor model with the engine model modified by the engine module. In particular, the engine module may update one or more engine property-value pairs and/or one or more engine property-property relationships based on synchronizing the engine model with the editor model. For example, when an editor module instantiates an editor property, the engine module may instantiate one or more corresponding engine properties. Responsive to user input, the editor module may update a value associated with an editor property-value pair. In addition, the engine module may synchronize one or more corresponding engine property-value pairs with the updated editor property-value pair. For example, a property-value pair may be parameterized by a time parameter. Accordingly, at a first time value, a first value may be associated with the property-value pair, and at a second time value, a second value may be associated with the property-value pair. Accordingly, the engine module may synchronize a value of an engine property-value pair with a value or a corresponding editor property-value pair at one or more time values of the time parameter.

Furthermore, at runtime, the engine module may configure a backend to execute the engine model. In particular, the backend may include one or more central processing units (CPUs) and/or one or more graphics processing units (GPUs). The backend may convert the engine model into machine-readable code and further execute the code to generate the animation effect.

FIG. 1 illustrates an example animation system 100, according to various embodiments. In particular, the animation system 100 includes an editor model 115, an engine model 125, a runtime model 135, and a cloned engine model 125. In various embodiments, the editor module 110 may be defined to facilitate user generation and modification of an animation effect, while the engine model 125 may be defined to facilitate conversion of the animation effect into a computer-readable model for processing by a backend (e.g., a CPU and/or a GPU).

In various embodiments, the editor module 110 may generate one or more display modules 140 that enables users to view and modify an animation effect. For example, the editor module 110 may generate a viewport module that displays the animation effect rendered by the animation system 100. In addition, the editor module 110 may generate a manipulator module. The manipulator module may allow a user to modify animation effects. For example, the manipulator module may receive user input, and based on the user input modify one or more editor values stored in the editor model 115.

In various embodiments, elements of an animation effect may be defined by one or more properties. A property may correspond to a color, a position, a size, a rotation, and so forth. In addition, a value may correspond to a value of the property. For example, a value may describe a color value of the color property, a coordinate value of the position property, a magnitude of the size property, a degree of the rotation property, and so forth. Each property-value pair may be stored in a model. In particular, the property-value pairs may define one or more elements of an animation effect. For example, and not by way of limitation, an element of the animation effect may include an object, an asset, a layer (e.g., a background layer, a mask layer, etc.). In various embodiments, each element may be defined by a set of property-value pairs (e.g., a color property-value pair, a position property-value pair, a rotation property-value pair, etc.). By using various display modules 140 (e.g., the manipulator module), a user may add, remove, and/or modify one or more properties of an element of the animation effect. Similarly, the user may utilize one or more of the display modules 140 to adjust a value of a property.

In addition, the user may utilize the display modules 140 to define an animation sequence for one or more elements of the animation effect. For example, responsive to user input, the editor module 110 may store a set of values associated with a property (e.g., a position property). The set of values may be parameterized by a time parameter. Accordingly, at different time values of the time parameter, the property may be associated with a different value of the set of values associated with the property.

Furthermore, the user may utilize display modules 140 to define relationships between properties and/or between elements of the animation effect. In particular, responsive to user input, the editor module 110 may link a first property with one or more other properties. Accordingly, as a value of the first property changes, one or more values of the one or more other properties may also change. For example, responsive to user input, the editor module 110 may associate a color property with a position property. Accordingly, as the color value of the color property changes, a coordinate value of the position property may also change.

In various embodiments, responsive to user input, the editor module 110 may also link properties associated with different elements. For example, responsive to user input, the editor module 110 may associate a first property of a first element with one or more properties of one or more other elements. Accordingly, as a value of the first property changes, one or more values of the one or more properties of the one or more other elements may also change. In particular, responsive to user input, the editor module 110 may link a position property of a mask layer with a position property of an object. Accordingly, as a coordinate value of the position property of the mask layer changes, a coordinate value of the position property of the object may also change.

In various embodiments, the editor module 110 stores the animation effect in an editor model 115. In particular, the editor module 110 may store, for example, and not by way of limitation, editor property-value pairs associated with elements of the animation effect, relationships between editor properties, sets of editor values associated with editor properties that are parameterized by a time parameter, and so forth.

In various embodiments, the engine module 120 may also store a version of the animation effect in an engine model 125. For example, the animation effect defined by the engine model 125 may be a version of the animation effect defined by the editor model 115 that is suitable for execution by a backend. In particular, the editor properties and editor values may be defined to facilitate user definition and modification of a displayed animation effect, while the engine properties and the engine values may be defined to facilitate backend execution of the animation effect. For example, a position editor property may correspond to pixel location on a display, while a position engine property may correspond to a coordinate position. For example, and not by way of limitation, the engine module 120 may store engine property-value pairs associated with elements of the animation effect, relationships between engine properties, sets of engine values associated with engine properties that are parameterized by a time parameter, and so forth. In various embodiments, at runtime, the engine model 125 may be utilized in rendering the animation effect, as described below.

At runtime, the engine module 120 may clone the engine model 125 to generate an immutable computer-readable model of the animation effect for processing by a backend. This immutable model is referred to herein as a script-engine model 130. The backend executes the script-engine model 130 to render the animation effect. In particular, the backend may compute one or more animation property-value pairs that describe properties of elements of the animation effect.

In addition, at runtime, the editor module 110 may clone the editor model 115 to produce a runtime model 135. The runtime model 135 may store runtime versions of editor property-value pairs, editor property-property relationships, and so forth. In particular, the editor module 110 may utilize runtime property-value pairs to display the animation effect as described in more detail below.

In particular, in the animation system 100, the script-engine model 130 and the runtime model 135 are immutable. Accordingly, the editor module 110 does not modify the runtime model 135 based on user input and the engine module 120 does not modify the script-engine model 130 based on user input.

In various embodiments, when the animation effect is not being executed, the editor module 110 synchronizes editor property-value pairs with engine property-value pairs. For example, based on user input, the editor module 110 may determine that at a first time value of the time parameter, a value of a first editor property should be increased or decreased. Accordingly, during synchronization, the editor module 110 may transmit an indication to the engine module 120 to increase or decrease a value of a corresponding engine property at the first time value of the time parameter. Based on the indication, the engine module 120 may identify an engine property that corresponds to the editor property and increase or decrease a value associated with the identified engine property at the first time value.

In various embodiments, the engine module 120 may update the engine values for each engine property in the engine model 125 based on user input. In particular, when the editor module 110 updates an editor property-value pair responsive to user input, the editor module 110 may synchronize the updated editor property-value pair with a corresponding engine property-value pair stored in the engine model 125. In particular, as described above, the editor module 110 may transmit a notification to the engine module 120, which may update an engine property-value pair corresponding to the updated editor property-value pair.

Similarly, during execution of the animation effect, the engine module 120 may synchronize script-engine property-value pairs stored in the script-engine model 130 with runtime property-value pairs stored in the runtime model 135. In particular, when the backend updates a script-engine property-value pair, the engine module 120 may transmit a notification to the editor module 110 indicating that a script-engine property-value pair has been updated. Based on the notification, the editor module 110 may update a runtime property-value pair that corresponds to the updated script-engine property-value pair. In addition, the editor module 110 may update one or more display modules 140 based on the synchronized runtime property-value. For example, the editor module 110 may update a property-value pair corresponding to an element of the animation effect displayed in the viewport module. Additionally, or alternatively, the editor module 110 could update a runtime value displayed in an inspector module, where the runtime value is associated with a runtime property of an element of the animation effect. Accordingly, when the backend updates the script-engine model 130, the engine module 120 and the editor module 110 may propagate the script-engine model 130 updates to update the displayed animation effect via the runtime model 135.

For example, based on the synchronization step, the editor module 110 may determine that a runtime value of a runtime property should be increased during at a second time value of a time parameter. The runtime property may correspond to a position of an object displayed in the viewport module. Accordingly, when the second time value occurs during the animation effect display timeline, the editor module 110 may implement the updated runtime property-value pair to display the animation effect. In particular, continuing from the above example, the editor module 110 could display the above-reference object at a position of the display that corresponds to the updated runtime value of the position property.

One drawback of the animation system 100 is that the user cannot update an animation effect while the backend is executing the script-engine model 130. In particular, both the runtime model 135 and the script-engine model 130 are immutable. Accordingly, in order to modify an animation effect, the user must first update the editor model 115 and the engine model 125, and further trigger the animation system 100 to re-clone the updated editor model 115 and the updated engine model 125 to generate an updated immutable runtime model 135 and an updated immutable script-engine model 130, respectively. Then, when the animation system 100 renders the animation effect based on the updated immutable script-engine model 130, the user modifications to the animation effect are propagated to the displayed animation effect displayed on one or more display modules 140.

However, requiring that an animation effect (described by an editor model 115 and an engine model 125) must be recompiled in order to display user modifications to an animation effect may prove disruptive, time-consuming, and cumbersome to users. Accordingly, users are unable to dynamically control an animation effect while the animation effect is being executed, thereby slowing the creative process and frustrating users. Accordingly, ways to reduce the friction in animation effect generation and modification may be useful.

Figure 2:
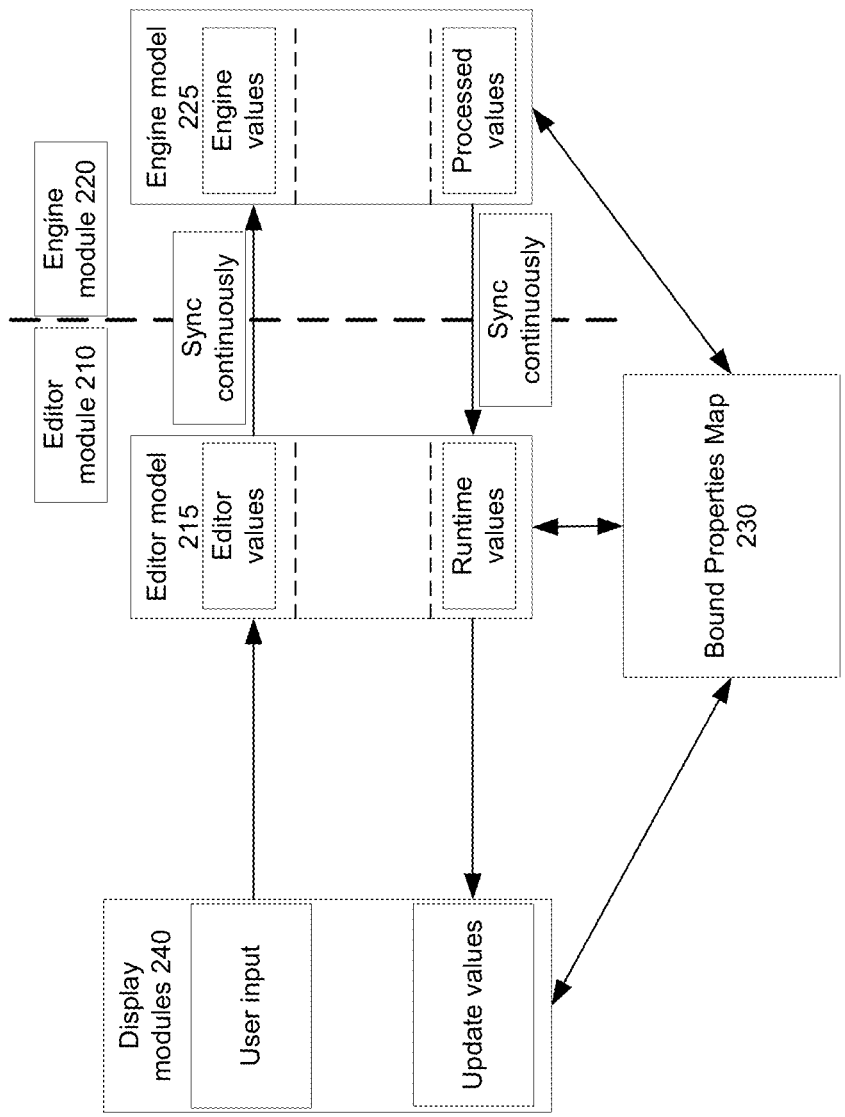
FIG. 2 illustrates an example animation system with continuous run, according to various embodiments.

FIG. 2 illustrates an example animation system 200, according to various embodiments. In particular, animation system 200 includes an editor module 210 and an engine module 220. As stated above, the editor module 210 receives user input via one or more display modules 240, stores the user input in an editor model 215, as well as utilizing runtime property-value pairs associated with elements of an animation effect to render the animation effect.

In various embodiments, the engine module 220 may store engine values and processed animation values for engine properties in the engine model 225. The engine model 225 may be defined as an alternative version of the editor model 215. In particular, the engine model 225 may store versions of editor property-value pairs and editor instructions (e.g., relationships between editor properties, animation effect timing sequences, etc.) that are suitable for processing by the backend. The engine model 225 may also store processed animation properties and values for updating the animation effect. For example, a location of an element of an animation effect may be defined by one or more editor properties as a set of cartesian position coordinates. The engine model 225, however, may store the location of the element using engine properties and values corresponding to spherical position coordinates. Additionally, or alternatively, the location of the element may be stored in the engine model 225 as a pixel location.

In various embodiments, the engine module 220 stores information in the engine model 225, including engine property-value pairs and instructions for processing the engine property-value pairs by a backend (e.g., a central processing unit, a graphics processing unit, etc.) to generate processed animation property-value pairs. The engine module 220 may further pass engine property-value pairs with instructions (e.g., relationships between engine properties) to the backend for processing. The backend processes the property-value pairs to generate processed animation property-value pairs. For example, the backend may implement a GPU to compute a color property for one or more pixels. The computed color may be stored in a color property-value pair and the pixel location may be stored in a location property-value pair in the processed animation property-value pairs. In addition, an instruction may link the location property-value pair to the color property-value pair. The engine module 220 may further store the processed animation property-value pairs in the engine model 225.

In particular embodiments, the editor module 210 stores editor property-value pairs and runtime property-value pairs in an editor model 215. The editor property-value pairs may be defined by user input, while the runtime property-value pairs may define an animation effect to render. In various embodiments, runtime values may be determined based on editor values and/or based on processed animation property-value pairs, as described in further detail below.

In various embodiments, the editor module 210 may receive user input in various ways. For example, the editor module 210 may display a graphical user interface (e.g., an AR studio interface). The display modules 240 may include a scripting module, into which a user may provide instructions for generating the animation effect (e.g., using a scripting language). Additionally, or alternatively, the display modules 240 may also include a visual programming interface (e.g., a patch editor module 210), which enables users to define elements, element properties and values, and relationships between properties of elements in an animation effect. In particular embodiments, the display modules 240 may also include one or more displays that output a generated animation effect based on user input (e.g., a viewport module). The display modules 240 may include an inspector module that allows users to view runtime values associated with runtime properties of elements of the animation effect, as the animation effect is being rendered. The display modules 240 may also include a simulator module that allows a user to view a version of the animation effect rendered on a particular type of display (e.g., a tablet display or a mobile phone display).

In various embodiments, the editor module 210 synchronizes editor property-value pairs with engine property-value pairs. For example, based on user input, the editor module 210 may determine that at time step one a value of a first editor property should be increased or decreased. Accordingly, the editor module 210 may transmit an indication to the engine module 220 to increase or decrease a value of a corresponding engine property at time step one. Based on the indication, the editor module 210 may identify an engine property that corresponds to the editor property and increase or decrease a value associated with the identified engine property at time step one.

In various embodiments, the engine module 220 may update the engine values for each engine property in the engine model 225 based on user input. In particular, the editor module 210 may continuously synchronize editor values in the editor model 215 with corresponding engine values stored in the engine model 225. Continuous synchronization enables user input received by the editor module 210 (e.g., via a GUI) to be propagated by the engine module 220 to the engine model 225. The backend receives the updated engine property-value pairs and updated processing information and, based on the updates outputs new processed animation property-value pairs for displaying the animation effect. In this manner, the animation system 200 enables dynamic users control of an animation effect as the animation system 200 is rendering the animation effect.

In addition, the engine module 220 may synchronize processed animation property-value pairs with runtime property value pairs stored in the editor model 215. For example, when a processed animation property-value pair is updated, the engine module 220 may send an indication to the editor module 210. The editor module 210 may synchronize one or more corresponding runtime property-value pair with the updated processed animation property-value pair.

The editor module 210 may further update a displayed animation effect based on the synchronized runtime property-value pairs. For example, based on the synchronization step, the editor module 210 may determine that a runtime value of a runtime property should be increased during time step two. The runtime property may correspond to a position of an object displayed in the viewport module. Accordingly, updating the runtime value may correspond to shifting a position of the object to the left at time step two. Therefore, based on the synchronization step, the editor module 210 may shift the position of the object in the viewport to the left at time step two.

In various embodiments, to facilitate synchronization between editor property-value pairs and engine property-value pairs and synchronization between processed animation property-value pairs and runtime property-value pairs, an editor-engine property map may be implemented that describes a relationship between editor properties and engine properties. For example, the editor-engine property map may provide a relationship between a set of editor property-value pairs defining a cartesian position and an engine property-value pairs defining a pixel location. As editor properties are defined by user input, the editor-engine property map may be dynamically updated to include relationships between new editor property-value pairs and new engine property-value pairs (and similarly, processed animation property-value pairs and runtime property-value pairs). Alternatively, the editor-engine property map may be a static map that includes a fixed set of relationships between editor property-value pairs and engine property-value pairs. The editor module 210 and/or the engine module 220 may access the editor-engine property map when performing synchronization. In particular, the editor module 210 may access the editor-engine property map to determine one or more engine property-value pairs that are associated with an editor property-value pair that is updated based on user input. Similarly, the engine module 220 may access the editor-engine property map to determine one or more runtime property-value pairs that are associated with a processed animation property-value pairs that is updated by the backend to facilitate synchronization of editor runtime property-value pairs with engine processed animation property-value pairs.

In various embodiments, the editor-engine property map may be an injective, surjective, and/or bijective mapping of editor property-value pairs to engine property-value pairs (and similarly, processed animation property-value pairs to runtime property-value pairs). For example, the engine model 225 may store a position property of an element of an animation effect as a set of coordinates (e.g., a x-coordinate, a y-coordinate, and a z-coordinate). The editor model 215 may store a similar position property as a pixel location. Accordingly, the editor-engine property map may associate the position property of the engine model 225 with the position property of the editor model 215. For example, the editor-engine property map may convert the set of coordinates into a pixel location. In various embodiments, the editor-engine property map may also be used in the reverse. Accordingly, the editor-engine property map may be implemented to convert a pixel location into a set of coordinates.

In various embodiments, as a user views a generated animation effect, the user may want to modify various aspects of the animation effect. In various systems, to modify an animation effect, the user stops the animation effect, adjusts one or more aspects of the animation effect, and then restarts the animation effect from the beginning. Functionally, as described above, animation systems may receive user input, define editor models 215 and engine models 225 based on the user input, and further clone the editor models 215 and the engine models 225 to generate immutable runtime models. The immutable runtime models are used to generate the animation effect. One drawback of various techniques is that immutable runtime models cannot be modified. Accordingly, to modify the animation effect, a new set of immutable runtime models must be instantiated to incorporate the user input. The backend uses the new runtime models to recompute animation runtime values for rendering the animation effect, thereby restating the animation effect from the beginning. Accordingly, some techniques for generating animations may be cumbersome, tedious, and inflexible.

Unlike the animation system 200, the animation system 200 enables dynamic modification of displayed properties of objects, while an animation effect is being executed. In particular, in the animation system 200, various properties may be defined as bindable properties. Bindable properties are properties that may be dynamically updated as the backend executes an animation effect. Bindable properties may include two values: an editor value and an engine value. In various embodiments, the editor value may be defined by user input and stored in the editor module 210. In addition, the engine value may be dynamically defined by the backend as the backend processes the animation effect defined by the engine model 225. In various embodiments, bindable properties may further be defined as unbound or bound. A value of unbound bindable properties may be dynamically updated based on user input, while a value of bound bindable properties may be fixed with respect to user input.

With respect to bindable properties designated as unbound, the editor module 210 may receive user input defining a value of the unbound bindable property. For example, the editor module 210 may generate a manipulator module and a viewport module. The manipulator module may enable a user to adjust values and properties associated with elements of the animation effect, while the viewport module may display the animation effect. In particular, the editor module 210 may receive user input and adjust editor values associated with unbound bindable properties. The editor module 210 may further pass the updated editor values to various display module. For example, the editor module 210 may pass the updated editor values to the inspector module. Accordingly, when the user selects an element of the animation effect corresponding to the updated editor value, the inspector module may access the updated editor value from the editor model 215 and display the output the updated editor value for display to the user. Accordingly, a user input is propagated to display modules 240 generated by the editor module 210.

In addition, as described above, the editor module 210 may continuously synchronize editor property-value pairs with engine property-value pairs stored in the engine module 220. With respect to unbound bindable properties, the editor module 210 may synchronize an editor value corresponding to an unbound bindable property with an engine value corresponding to the unbound bindable property. For example, the editor module 210 may pass the user-updated editor value corresponding to a particular time step of the animation effect to the engine module 220. The engine module 220 may update the engine value of the unbound bindable property as the corresponding time step. As the backend executes the animation effect, the backend may utilize the updated engine value in completing one or more execution steps. Accordingly, user-inputted value may be implemented in generating the animation effect. In further embodiments, the one or more processed animation property-value pairs are generated that correspond to the unbound bindable property. The engine module 220 synchronizes the processed animation property-value with a corresponding runtime property-value pair stored in the editor model 215. For example, the engine module 220 may pass the value of the processed animation property-value pair corresponding to a particular time step to the editor module 210. The editor module 210 may further update a runtime value corresponding to the received processed animation value and utilize the runtime value to update an animation effect displayed by the viewport module. Accordingly, rendered animation effect may be modified by user input as the animation effect is being rendered.

With respect to bindable properties designated as bound, the editor module 210 may disable user modification of editor values associated with bound bindable properties. Accordingly, the editor value of bound bindable properties may be fixed throughout execution of an animation effect. However, the engine value of bound bindable properties may vary as the backend executes the animation effect. For example, the editor value associated with a bound bindable property corresponding to a position of an element may remain fixed at the initial position of the object when the position property was designated as a bound bindable property (e.g., when the animation effect was initially defined). The engine value, however, may increase and decrease as the backend-computed position of the element changes as the animation effect is executed.

In various embodiments, the editor module 210 may disable user input for properties corresponding to bound bindable properties. For example, the editor module 210 may disable input fields in a manipulator module and/or disable input field in an inspector module corresponding to bound bindable property (e.g., the editor module 210 may grey out the disabled input field). Accordingly, the editor module 210 may not receive user input to modify an editor value associated with a bound bindable property. In so doing, the editor value of the bound bindable property may remain fixed as the animation effect is executed. In various embodiments, as described above, the editor module 210 may perform a synchronization step with the engine module 220. With respect to bound bindable properties, the editor module 210 may synchronize an editor value corresponding to the bound bindable property with an engine value corresponding to the bound bindable property. In particular, the editor module 210 may pass the editor value to the engine module 220 for synchronization. The editor value may correspond to one or more time steps of an animation effect. The engine module 220 may update an engine value of the bound bindable property based on the received editor value at corresponding time steps. In addition, as the backend executes the animation effect defined by the engine module 220, the backend may utilize the updated engine value at one or more execution steps. Further, the backend may output the engine value as a processed animation value corresponding to the bound bindable property. In various embodiments, the engine module 220 may synchronize the processed animation value with a runtime value corresponding to the bound bindable property. The editor module 210 may utilize the runtime value to update a displayed animation effect. In addition, the editor module 210 may update a displayed field corresponding to the bound bindable property with the runtime value. For example, the inspector module may display the runtime value in a disabled user input field corresponding to the bound bindable property.

Although the editor module 210 may not update the editor value of bound bindable properties based on user input, the editor value of bound bindable properties may change as the backend executes the animation effect defined by the engine model 225. For example, a bound bindable property may corresponding a color of an element. Accordingly, the editor value of the bound bindable property may be fixed, and the engine value of the bound bindable may be synchronized to match the editor value. As the backend executes the animation effect defined by the engine model 225, the engine value of the color property may change. For example, the engine model 225 may specify that the color property of the element is linked to a position property of the element. Accordingly, as the position of the element changes (e.g., the element moves across a display screen) the engine value of the color property may change. The engine module 220 may synchronize the engine value of the color property with a runtime value of the color property stored in the editor module 210. Furthermore, the viewport module may update a color of the element based on the runtime value associated with the color property. In addition, the inspector module may update a disable user input field corresponding to the bound bindable property to display the runtime value of the color property.

In addition, system environment 200 includes a bound properties map 230. Operationally, the bound properties map 230 maintains a real-time list of bindable properties designated as bound. In addition, the editor module 210 and/or the engine module 220 may access the bound properties map 230 in order to add and/or remove bindable properties from the bound properties map 230. In addition, the editor module 210 and/or the engine module 220 may query the bound properties map 230 to determine whether one or more properties are bound. For example, the editor module 210 may query the bound properties map 230 to determine whether a rotation property of an element of the animation effect is bound. If the rotation property is bound, then the editor module 210 may trigger the inspector module to disable an input field corresponding to a value of the rotation property of the element. Similarly, if the editor module 210 determines that all of the properties associated with the element of the animation effect are bound, then the editor module 210 may disable the manipulator module when the element is selected. Otherwise, the editor module 210 may disable the manipulator module from being used with bindable properties of the element that are bound (i.e., bindable properties stored in the bound properties map 230). In various embodiments, when a bindable property is designated as bound, then an onBound method is executed. The onBound method may add the bindable property to the bound properties map 230. Similarly, when the designation of a bindable property changes from bound to unbound, then another method may execute that removes the property from the bound properties map 230. In addition, the editor module 210 may receive user input that specifies a bindable property to designate as bound and/or unbound. Based on the user input, the editor module 210 may designate the bindable property as bound or unbound and further add or remove the bindable property from the bound property map, respectively.

In various embodiments, if an editor property is bound in the bound property map, then a corresponding engine property may also be designated as bound and added to the bound properties map 230. Similarly, if an engine property is removed from the bound property map, then a corresponding editor property may be removed from the bound properties map 230 as well. In particular, the editor-engine map may be implemented to identify editor properties corresponding to engine properties and engine properties corresponding to editor properties. As described above, the editor-engine map may be an injective, surjective, and/or bijective mapping of editor properties to engine properties and processed animation properties to runtime properties.

For example, two or more editor properties may correspond to a single engine property. Accordingly, if the engine property is bound, then the two or more editor properties may also be bound. However, if only one of the two or more editor properties corresponding to the single engine property are bound, then the corresponding engine property may be unbound or bound. Similarly, if an editor property is unbound, then each of the corresponding engine properties may also be unbound. If, however, based on the editor-engine map, the engine module 220 identifies that one or more of the corresponding engine properties further corresponds to at least one editor property that is bound, then the engine module 220 may determine that the one or more corresponding engine properties should remain bound.

In various embodiments, responsive to user input, the editor module 210 may designate one or more properties as bound or bound. Additionally, or alternatively, one or more bindable properties may be defined as bound or unbound before execution of the animation effect. In further embodiments, the editor module 210 and/or the engine module 220 may determine that a bindable property should be designated as bound or unbound.

As stated above, the editor module 210 may generate one or more display modules 240 that facilitate users in generating and editing animation effects. These display modules 240 may include, for example, and not by way of limitation, a viewport module, a simulator module, a manipulator module, a scripting module, a patch editor module 210, an inspector module, and so forth. In various embodiments, the inspector module may display values of one or more properties of elements of the animation effect. Elements may include objects, assets, layers (e.g., background layers, mask layers, etc.), and so forth. Properties may include, for example, and not by way of limitation, a position, a color, a size, a rotation, and so forth.

In particular embodiments, the inspector module may display one or more values corresponding to various properties of elements of the animation effect. For example, after receiving user selection of an element of the animation effect, the inspector module may display a list of properties associated with the element as well as a corresponding value for each property. In various embodiments, the inspector may include one or more options that enable users to editor values associated with properties and/or properties associated with elements of the animation effect. In some embodiments, these options may be gated. For example, based on user behavior, the editor module 210 may trigger the inspector module to display an option for adding and/or removing properties from an element of an animation effect. Additionally, or alternatively, based on user profile information and/or user behavior associated with a category with which the user is associated, the inspector module may add one or more options to the inspector GUI and/or remove one or more options from the inspector GUI. Options may include, for example, and not by way of limitation, selection options, numerical input options, control options, sliders, play/pause controls, reset controls, and so forth.

In various embodiments, when the bound properties map 230 is updated, the editor module 210 notifies the inspector module. Accordingly, based on the notification, the inspector module may adjust one or more displayed user input options. For example, based on receiving a notification that a property is added to the bound properties map 230, the inspector module may disable user input into a user input field corresponding to the property. In addition, the inspector module may receive runtime values associated with the property and further display the runtime values in the user input field corresponding to the property. Alternatively, if the inspector module receives a notification indicating that a property stored in the bound properties map 230 has been removed from the bound properties map 230 (i.e., the bindable property designation changed from bound to unbound), then the inspector module may enable a disabled user input field corresponding to the property. In addition, the editor module 210 may write user input received via the user input field to the editor value corresponding to the property stored in the editor model 215. Furthermore, the editor module 210 may by default read editor values from the editor module 210 and also display the editor value in association with the property to the user.

In addition, the inspector module may query the bound properties map 230 to determine whether one or more bindable properties are bound or unbound. For example, the inspector module may query the bound properties map 230 to identify properties associated with an element of an animation effect that are bound or unbound. Based on determining that a property is bound, then inspector module may disable a user input field associated with the property and display runtime values for that property. Based on determining that a property is unbound, the inspector module may enable user input into a user input field associated with the bindable property, update an editor value for the bindable property based on the user input, and further by default display the editor value for the property.

In further embodiments, one or more properties of a displayed element may be feature-gated. Accordingly, the inspector module may determine if the property should be displayed based on the feature-gating rules and if the property should be displayed, the inspector module may further query the bound properties map 230 to determine of a bindable feature-gated property is bound or unbound.

In various embodiments, the engine model 225 may provide an application programming interface (API) to enable one or more functions. For example, a display module may output a play/pause/reset control to enable a user to play, pause, and/or reset an animation effect. The engine module 220 may support the play/pause functionality by provide helper functions to enable playing, pausing, and resetting an animation effect.

In particular, when a control is selected, the editor module 210 receives an indication of the selected control from a display module. The editor module 210 transmits a notification of the selected control to the engine module 220 for implementation. Accordingly, the engine module 220 identifies one or more helper functions and triggers the backend to implement the helper function when processing the animation effect. For example, responsive to a selection of a pause control, the engine module 220 may select a helper function corresponding to fixing a time parameter to be fixed at a time t. Accordingly, the backend may generate processed animation property-value pairs corresponding to the time parameter being at time t. The processed animation property-value pairs are synchronized with the runtime property-value pairs and are further used by the editor module 210 to generate the animation effect. Because the time parameter is fixed at time t, the generated animation effect is continually rendered at time t. Accordingly, the visual effect to the user is that the animation effect is paused. However, inputted user edits to the animation effect are transmitted to the backend, used to generate updated processed animation property-value pairs, and further propagated to the displayed animation effect. Accordingly, in the paused state, the animation effect may be updated based on user input.

In further embodiments, when the user selects the play option, the editor module 210 sends the engine module 220 a notification that the user selected the play option. Accordingly, the engine module 220 selects a helper function that causes the backend to unfix the time parameter, thereby allowing time to propagate forwards. The time parameter propagating forward causes animation described by the rendered animation effect to continue.

In various embodiments, the animation system 200 may be implemented in conjunction with a video playback and/or a video feed. In embodiments with a video playback, when the play option is selected, the editor module 210 may start video playback in conjunction with trigging the engine module 220 to begin processing the animation effect. Similarly, when the pause option is selected, the editor module 210 may pause the video playback at the current frame as well as triggering the engine module 220 to pause the animation effect (i.e., to fix the time parameter of the animation effect). In various embodiments, when pausing a video playback, the editor module 210 may trigger the video playback to continually redisplay a current frame. In addition, when the reset option is selected, the editor module 210 may restart the video playback from an initial point, and further trigger the engine module 220 to reset the time parameter to the initial time parameter, while the backend continues executing the animation effect defined by the engine model 225.

Similarly, with respect to a video feed, when the play option is selected, the editor module 210 may start the video feed and trigger the engine module 220 to allow the time parameter to start propagating forward in time. When the pause option is selected, the editor module 210 may freeze the video feed at the current frame and trigger the engine module 220 to fix the time parameter at the current frame, while the backend continues to execute the animation effect defined by the engine model 225. Further, when the reset option is selected, the editor module 210 may restart the video feed and trigger the engine module 220 to reset the time parameter to the initial time parameter, while the backend continues executing the animation effect defined by the engine model 225.

In addition, other operations may also continue or stop while time is fixed. For example, one or more shader applications may stop execution when time stops.

In various embodiment, during continuous run, the editor module 210 may transmit user-generated scripts (a JavaScript™ executable file) to the engine module 220 for execution. The engine module 220 may convert the scripts into machine-readable code and further send the machine-readable code the backend for execution. For example, the engine module 220 may implement an interpreter (e.g., a JavaScript™ interpreter) to convert the script into machine-readable code. In various embodiments, after the animation system 200 has been instantiated, the scripting module may automatically transmit user-generated scripts to the editor module 210 for execution. In various embodiments, each time a script is saved, the engine module 220 configures the backend to restart execution of the script, setting the time parameter to an initial value. Similarly, if elements of the animation effect are modified (e.g., numerous values, properties, objects, and/or elements of the animation effect), the engine module 220 may also configure the backend to restart execution of the animation effect, setting the time parameter to an initial value.

The animation system 200 may operate in multiple states, including a preparing state, a running state, a paused state, and a broken state. In particular, when the animation system 200 is defined, the animation system 200 may begin in a preparing state. As the editor module 210 constructs the editor model 215 based on user input, the animation system 200 transitions from the preparing state to the running state. As described above, the editor model 215 is continually synchronized with the engine model 225. When an animation effect is sufficiently defined to be executable by the backend, the engine module 220 may trigger the backend to being executing the animation effect defined by the engine model 225. For example, a display module may display a progress bar or one or more other progress indicators that indicates whether an animation is ready to be executed. As the user defines the animation, the progress bar may progress until the animation is sufficiently defined to begin execution. Additionally, or alternatively, a user may select one or more pre-configured animation effects, which may begin execution after selection. The user may further modify the animation effect to using the display modules 240 (e.g., using the scripting module).

In various embodiments, when the backend begins executing the animation effect defined by the engine module 220, the display modules 240 may transition from preparing to running. For example, the inspector module may display runtime values of bound bindable properties associated with elements of the animation effect. The inspector module may also display editor values of unbound bindable properties. In various embodiments, user editing of displayed editor values may be enabled, however user editing of displayed runtime values may be disabled in the inspector module. In addition, the manipulator may enable user modification of element properties and corresponding values associated with unbound bindable properties, however, the manipulator may be disabled for bound bindable properties. In various embodiments, if all of the properties of an element are bound bindable properties, then the manipulator may be disabled for the element.

In various embodiments, after the backend begins executing the animation effect (i.e., continuous run begins), various display modules 240 may be instantiated. For example, after continuous run begins, a viewport module and/or a simulator module may be instantiated. The instantiated viewport module may display the animation effect rendered by the backend and the instantiated simulator may display a version of the animation effect as displayed on a particular type of device (e.g., a mobile device).

In various embodiments, if a large number of changes are made in the editor model 215, then the backend may stop execution in order to facilitate migration of the changes from the editor model 215 to the engine model 225 via synchronization. After the migration is complete, the engine module 220 may trigger the backend to resume executing the updated animation effect defined by the modified engine model 225. For example, a large number of changes may be made to an editor model 215 via a patch editor module 210. Change may include replacing a background layer, adding and/or removing elements from an animation effect (e.g., objects and assets), defining relationships between properties of multiple elements, and so forth. The editor module 210 may store the changes in the editor model 215 and further synchronize the editor model 215 with the engine model 225. Due to the large amount of changes, the engine model 225 may stop the backend execution while the modifications migrate, and further trigger the backend to begin execution after the migration is complete. In addition, when the backend stops execution, the viewport module and/or simulator module may pause display of the animation effect, until the backend resumes execution of the animation effect.

In addition, the display modules 240 may operate in a paused state. The paused state is defined by a user selecting a paused option of a display module Accordingly, in the paused state, the animation effect is continually rendered at a fixed point in time. In addition, video feeds and/or video playbacks are also fixed in time. Further, the changes to the animation effect are propagated to the displayed animation effect as described above.

Furthermore, the display modules 240 may operate in a broken state. In the broken state one or more error notifications may by displayed to a user. For example, the UI may display an error notification that indicates a particular user input is not allowed (e.g., inputting text into a numerical input field).

In various embodiments, the editor module 210 may generate one or more error notifications for display to the user. For example, the editor module 210 may generate a contextual error notification with respect to the play/pause button. In various embodiments, errors may be hashable and/or unique. In addition, unresolved errors may be handled with persistent error notifications or periodically delivered transient error notifications.

In various embodiments, error notifications may be displayed by the scripting module for scripting errors. In particular, exceptions may be displayed for invalid connections, loops, and/or generics type mismatch in user-generated code.

In various embodiments, the engine module 220 may also generate error notifications. As examples, the AR engine may generate notifications for input errors and/or computational errors. For example, the engine module 220 may hash scripting errors occurring in a scripting engine associate with the scripting module (e.g., a JavaScript™ engine). Additionally, or alternatively, the engine module 220 may generate persistent or transient error reports. For example, the engine module 220 may generate a persistent error report for an element definition error. After the problem is resolved, the engine module 220 may rescind the error report and/or mark the error report as resolved. Additionally, or alternatively the engine module 220 may generate transient error reports. Transient error notifications may be displayed for a first interval of time, after which the notification may be rescinded and/or removed. If the error is remains present after a pre-designated time interval, then the engine module 220 may generate another transient error notification and/or may further generate a persistent error notification. However, if the error is no longer present, then the engine module 220 may not continue to generate error notifications for the addressed error.

In various embodiments, as described above, the editor module 210 may generate one or more feature-gated display modules 240 (e.g., the inspector module). Accordingly, the editor module 210 may determine whether one or more options (e.g., play/pause options, reset options, etc.) should be displayed or removed from display on the display module(s).

Figure 3:
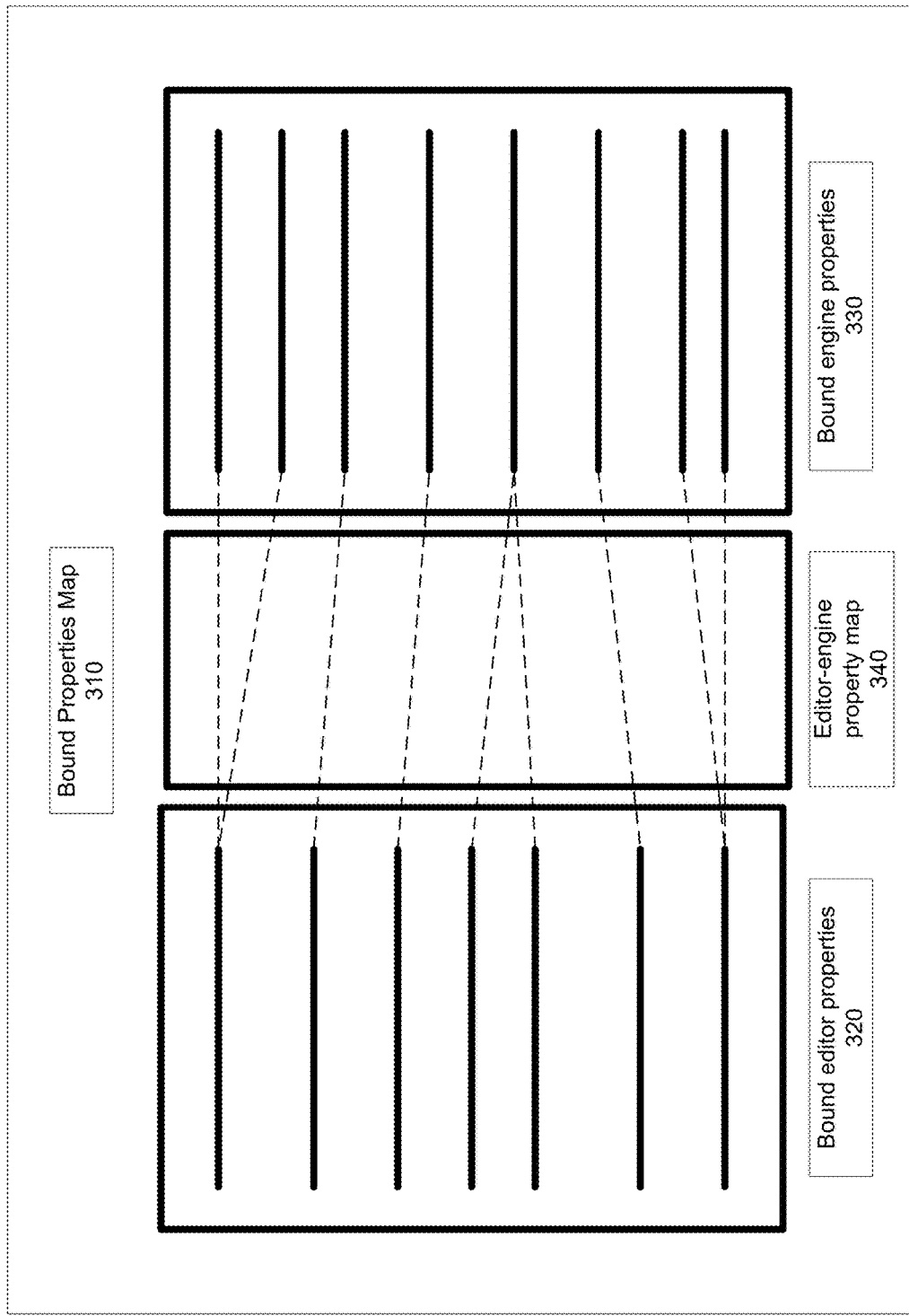
FIG. 3 illustrates an example bound properties map, according to various embodiments.

FIG. 3 illustrates an example bound properties map 310, according to various embodiments. In particular, bound properties map 310 includes a set of bound bindable editor property-value pairs 320, a set of bound bindable engine property-value pairs 330, and an editor-engine property map 240. The bound properties map 310 stores an indication of bound bindable properties. The editor module 210 may access the bound properties map 310 to determine if one or more editor properties are bound. In various embodiments, the editor module 210 may modify a display module based on whether a bindable property is bound or unbound, as described above. Similarly, the engine module 320 may access the bound properties map to determine whether an engine property is bound. If the engine property is unbound, then the engine module 320 may synchronize the engine property-value pair with one or more corresponding editor property-value pairs. The engine module 320 may further pass the synchronized engine property-value pair to the backend for processing. If the engine property is bound, then the engine module 320 may not synchronize the engine property-value pair with the corresponding editor property-value pair. Instead, the engine module 320 may pass the engine property-value pair to the backend. In various embodiments, the editor module 210 may synchronize runtime property-value pairs with processed animation property-value pairs outputted by the backend. The editor module 210 may further update an animation effect based on the synchronized runtime property-value pairs.

In various embodiments, the set of bound bindable editor properties 320 may be stored in the editor module 210. In addition, the set of bound bindable engine properties 330 may be stored in the engine model 325. Accordingly, the editor module 210 may access the editor-engine property map 240 to identify one or more engine properties that corresponds to an editor property. In various embodiments, the editor module 210 may further change a designation of a bindable property from bound to unbound or from unbound to bound based on identifying a designation of a corresponding bindable engine property. Additionally, or alternatively, the editor module 210 may transmit a notification to the engine module 320 that indicates (1) a bindable editor property that has a designation change from bound to unbound or from unbound to bound and/or (2) one or more engine bindable engine properties that should change a designation from bound to unbound or from unbound to bound. Similarly, the engine module 320 may access the editor-engine property map 240 to identify one or more editor properties that corresponds to an engine property and may further update the designation of a bindable engine property or transmit a notification to the editor module 210 that a designation of one or more bindable editor properties should be changed.

Figure 4:
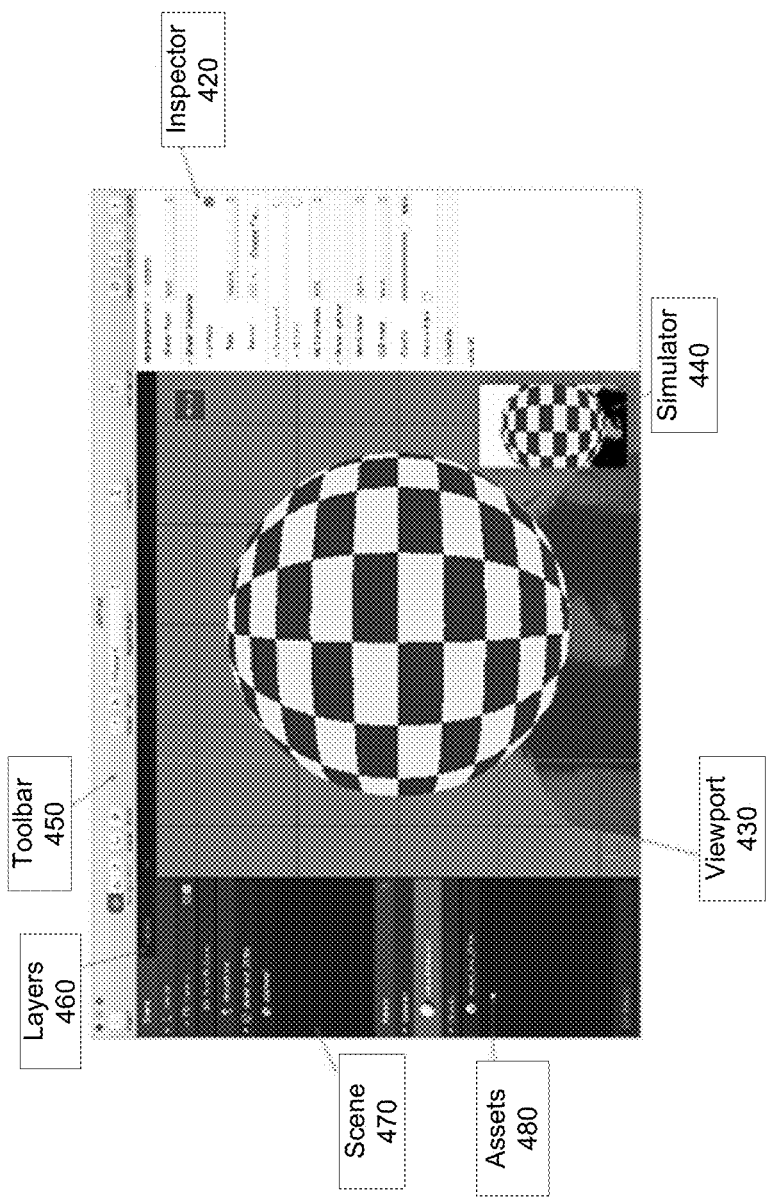
FIG. 4 illustrates example display modules generated by an animation system.

FIG. 4 illustrates example display modules 240 generated by the animation system 200. In particular, system environment 400 includes inspector module 420, viewport module 430, simulator module 440, toolbar module 450, layer module 460, scene module 470, and asset module 480. In various embodiments, inspector module 420 displays one or more property-value pairs associated with a selected element of an animation effect. For example, for unbound bindable properties, the inspector module may display editor values associated with the property. However, for bound bindable properties, the inspector module 420 may display runtime values for the bound bindable properties.

In various embodiments, the viewport module 430 may display a visual representation of the animation effect defined by the editor model 215 and the engine model 225. In various embodiments, the viewport module may also display a manipulator module that enable user modification of the animation effect. In various embodiments, the manipulator module may be displayed if all of the properties of a selected element are bound bindable properties. In addition, the viewport module may display a simulator module. The simulator module displays a version of the animation effect that may be rendered on a particular display type (e.g., a mobile device display, a tablet display, etc.).

In addition, the toolbar module 450 may include a play/pause control and a reset control. Accordingly, a user may adjust the time parameter of an animation effect. In particular, when the pause control is selected, the animation system 200 may continually re-render the animation effect at a fixed time value of a time parameter. In addition, the animation system 200 may cause a video playback to continually re-render a single frame. When the play control is selected the animation system 200 may all the time value of the time parameter to increment, thereby causing the animation effect to continue execution. In addition, the animation system 200 may enable the video playback to continue playback from the current scene. In various embodiments, when the animation system 200 receives an indication that the user selected the reset control, the animation system may set the time value of the time parameter to an initial value and further allow the time parameter to increment as the backend executes the engine model 225. In addition, the animation system 200 may cause the video playback to start form an initial frame.

Furthermore, the layer module 460 may enable a user to display a background layer, a mask layer, and so forth. In addition, the user may control various properties of each layer (e.g., a color property, a position property, and opacity property, etc.). In addition, the scene module 470 and the asset module 480 may allow the user to modify one or more background effects and/or image/asset layers. In various embodiments, users may also add, remove and/or modify properties and values associated with scenes and assets displayed in the animation effect.

Figure 5:
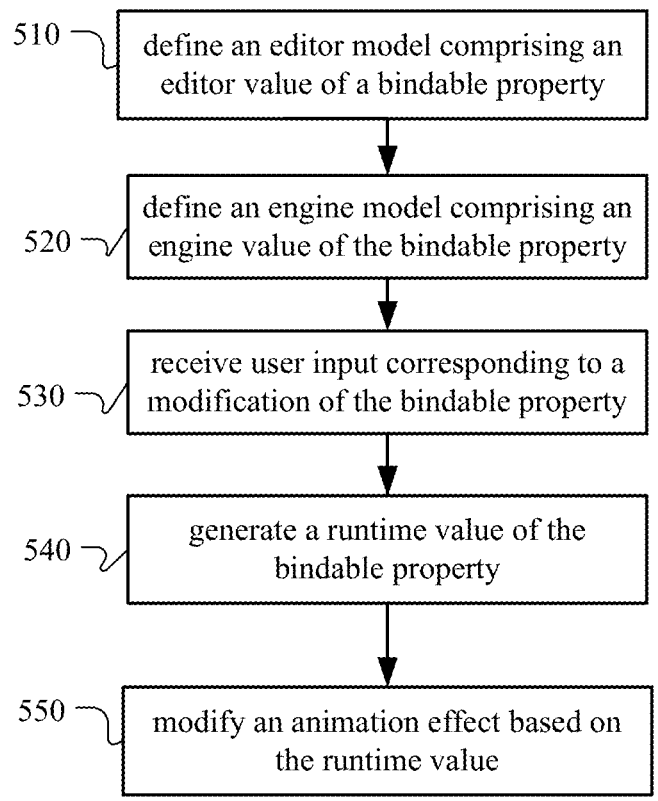
FIG. 5 illustrates an example method for enabling user modification of an animation effect during continuous run, according to various embodiments.

FIG. 5 illustrates an example method 500 for enabling user modification of an animation effect during continuous run, according to various embodiments. The method 500 may begin at step 510, where the animation system 200 defines an editor model including an editor value of a bindable property. At step 520, the animation system 200 defines an engine model including an engine value of a bindable property. In various embodiments, bindable properties may include two values: an editor value and an engine value. In addition, the bindable property may be designated as bound or unbound. If the bindable property is designated as bound, then a user modification of the bindable property may be disabled. However, if the bindable property is designated as unbound, then a user modification of the bindable property may be enabled.

At step 530, the animation system 200 receives user input corresponding to a modification of the bindable property. If the bindable property is bound, then the animation system 200 may not modify the bindable property based on the user input. However, if the bindable property is unbound, then the animation system 200 may modify an editor value corresponding to the bindable property.

At step 540, the animation system 200 may generate a runtime value of the bindable property. In particular, if the property if bound, then the animation system 200 may determine the runtime value based on one or more processed animation values computed by the backend using the engine model. However, if the animation system 200 may compute the runtime value of the bindable property based on an editor value of the bindable property. In particular, the animation system 200 may synchronize the user updated editor value of the bindable property with an engine value of the bindable property. The animation system 200 may further generate a processed animation value from the bindable property based on the engine value and further synchronize the processed animation value with a runtime value. Accordingly, the runtime value may be computed based on the user-modified editor value.

At step 550, the animation system 200 modifies the animation effect based on the runtime value. For example, based on the runtime value, the animation system 200 may increase or decrease a value of a property associated with an element of the animation effect.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for enabling user modification of an animation effect during continuous run including the particular steps of the method of FIG. 5, this disclosure contemplates any suitable method for enabling user modification of an animation effect during continuous run including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
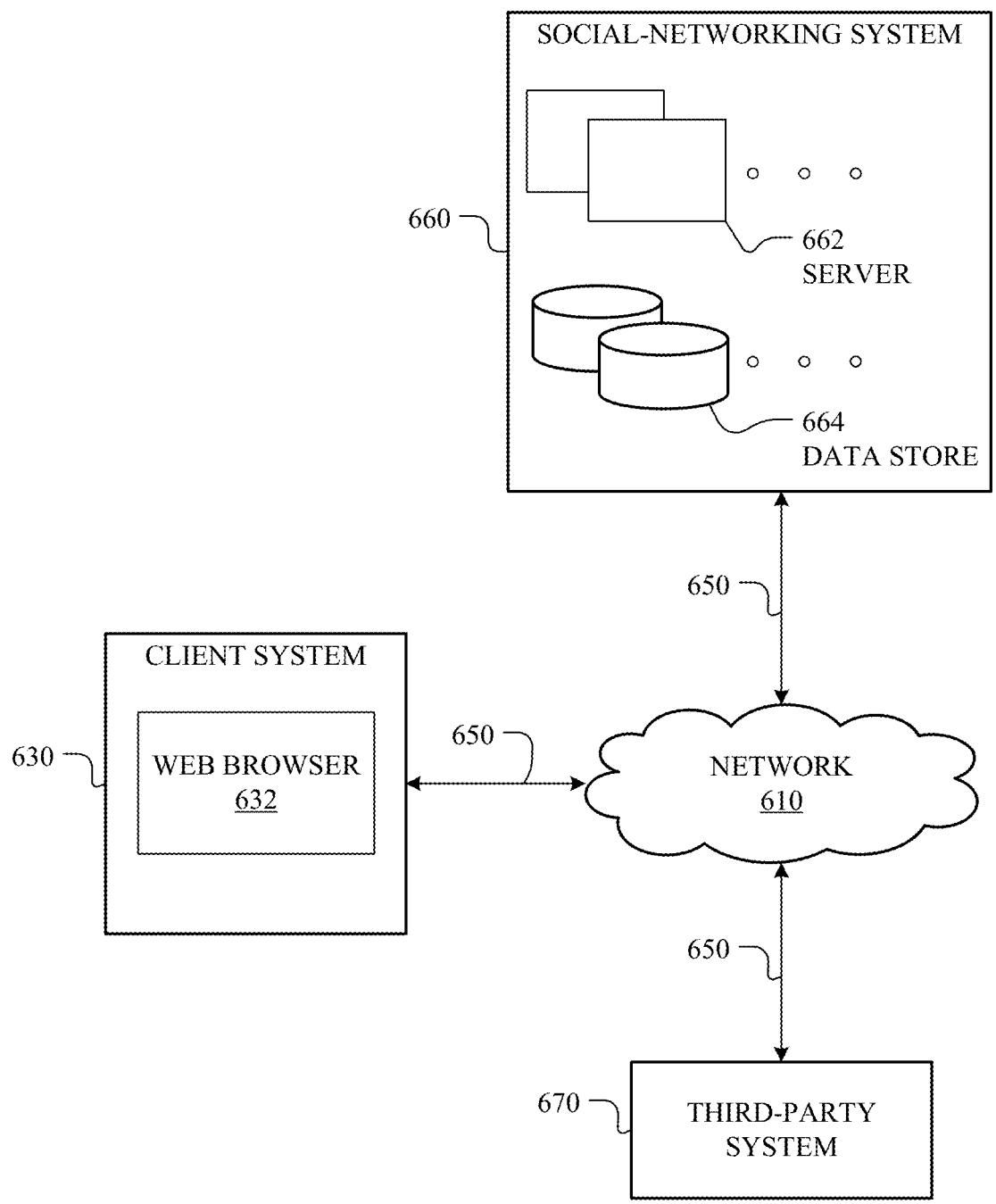
FIG. 6 illustrates an example network environment associated with a computing system, according to various embodiments.

FIG. 6 illustrates an example network environment 400 associated with a social-networking system. Network environment 400 includes a client system 430, a social-networking system 660, and a third-party system 670 connected to each other by a network 510. Although FIG. 6 illustrates a particular arrangement of client system 430, social-networking system 660, third-party system 670, and network 510, this disclosure contemplates any suitable arrangement of client system 430, social-networking system 660, third-party system 670, and network 510. As an example, and not by way of limitation, two or more of client system 430, social-networking system 660, and third-party system 670 may be connected to each other directly, bypassing network 510. As another example, two or more of client system 430, social-networking system 660, and third-party system 670 may be physically or logically co-located with each other in whole or in part. Moreover, although FIG. 6 illustrates a particular number of client systems 430, social-networking systems 660, third-party systems 670, and networks 510, this disclosure contemplates any suitable number of client systems 430, social-networking systems 660, third-party systems 670, and networks 510. As an example, and not by way of limitation, network environment 400 may include multiple client system 430, social-networking systems 660, third-party systems 670, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 430, social-networking system 660, and third-party system 670 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 400. One or more first links 550 may differ in one or more respects from one or more second links 550.

In particular embodiments, client system 430 may be an electronic device including hardware, software, or embedded logic components or a combination of two or more such components and capable of carrying out the appropriate functionalities implemented or supported by client system 430. As an example, and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 510. A client system 430 may enable its user to communicate with other users at other client systems 430.

In particular embodiments, client system 430 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In various embodiments, the client system 430 may include one or more input/output (I/O) devices. The client system 430 may receive input via one or more of the input devices. In addition, the client system may output information via one or more of the output devices. For example, and not by way of limitation, the client system 430 may use one or more input devices, including, for example, and not by way of limitation, cameras, touch screens, mice, pointers, keyboards, and so forth. In addition, the client system 430 may include one or more output devices, such as visual output devices (e.g., displays), audio output devices (e.g., speakers), and so forth.

In various embodiments, the client system 430 may also store an animation system. The animation system may include an editor module and an engine module. The editor module may configure the client system 430 to perform one or more operations, including for example and not by way of limitation, receiving user input and outputting an effect for display to the user. In various embodiments, the editor module may receive user input via one or more input devices of the client system 430 that defines an effect (e.g., an animation, a simulation, a graphic, etc.). The editor module may store the user input in an editor model and further synchronize the editor model with an engine model modifiable by the engine module. In various embodiments, the editor module may further implement one or more of the output devices to output an animation effect to a user. For example, the editor module may utilize one or more display modules to output the animation effect described by one or more runtime properties and runtime values on a visual output device of the client system 430.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 400 either directly or via network 510. As an example, and not by way of limitation, client system 430 may access social-networking system 660 using a web browser 632, or a native application associated with social-networking system 660 (e.g., a mobile social-networking application, a messaging application, another suitable application, or any combination thereof) either directly or via network 510. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In various embodiment, the social-networking system 660 may store one or more user nodes. The user nodes may include user profiles that indicate user preferences. For example, a first user profile could indicate that a first user prefers to view text-based content objects, while a second user profile could indicate that a second user prefers to listen to audio-based content objects.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 510.

In particular embodiments, social-networking system 660 may be capable of linking a variety of entities. As an example, and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 430. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example, and not by way of limitation, a user communicates posts to social-networking system 660 from a client system 430. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 430 or one or more third-party systems 670 via network 510. The web server may include a mail server or other messaging functionality for receiving and routing messages between social-networking system 660 and one or more client systems 430. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 430 associated with users. Advertisement-pricing modules may combine social information, the current time, location information, or other suitable information to provide relevant advertisements, in the form of notifications, to a user.

Figure 7:
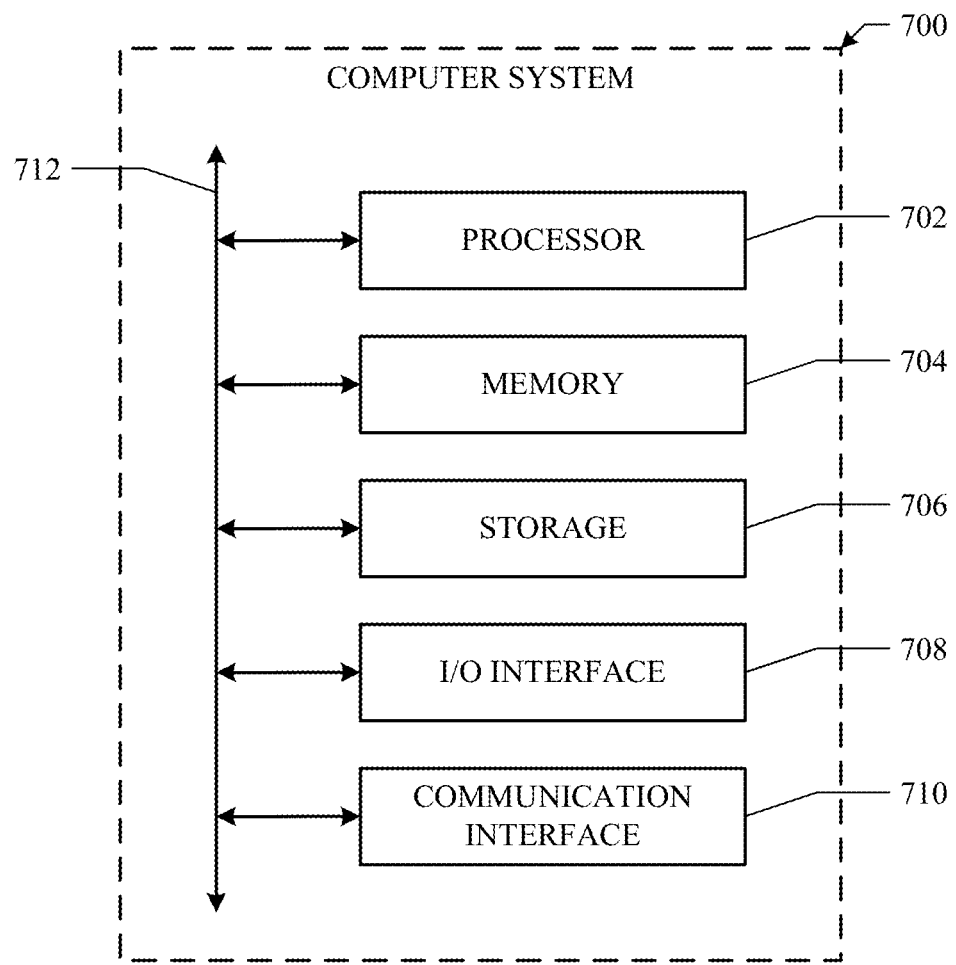
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by one or more computing systems, generating an editor user interface, wherein the editor user interface comprises:
an editor module that comprises an editor model, wherein the editor model comprises an editor value corresponding to a bindable property associated to an animation effect; and
an engine module that comprises an engine model, wherein the engine model comprises an engine value corresponding to the bindable property;
by the one or more computing systems, receiving user input corresponding to a modification of the editor value;
by the one or more computing systems, modifying the editor value based on the user input;
by the one or more computing systems, continuously synchronizing the modified editor value with the engine value;
by the one or more computing systems, generating a processed animation value based on the synchronized engine value; and
by the one or more computing systems, modifying the animation effect based on the processed animation value.

2. The method of claim 1, further comprising:
displaying the animation effect in a display module associated with the editor user interface;
synchronizing the processed animation value with a runtime value, wherein the editor module further comprises the runtime value; and
outputting the runtime value in the display module while the animation effect is displayed.

3. The method of claim 2, wherein modifying the animation effect further comprises:
   updating the engine model based on the synchronized engine value;
   rendering the animation effect using the updated engine model to produce a modified animation effect; and
   displaying the modified animation effect in the display module.

4. The method of claim 2, wherein the runtime value is initially set to the editor value.

5. The method of claim 4, wherein the bindable property is designated as bound or unbound, wherein if the bindable property is designated as bound, then the modified editor value is not synchronized with the engine value.

6. The method of claim 5, further comprising a bound properties map, wherein if the bindable property of the bindable property is designated as bound, then the bindable property is stored in the bound properties map.

7. The method of claim 5, wherein a first object comprises the bindable property, and if the bindable property is designated as unbound, then enabling replacement the first object with a second object.

8. The method of claim 7, wherein the animation effect displayed on the editor user interface restarts if:
   the first object is removed from the animation effect;
   the second object is added to the animation effect; or
   the first object is renamed.

9. The method of claim 5, wherein the designation of the bindable property is updated from unbound to bound while the animation effect is displayed.

10. The method of claim 9, wherein one or more options of the display module are gated based on user behavior.

11. The method of claim 1, further comprising a static map, wherein the static map associates the editor value with the engine value.

12. The method of claim 6, wherein the editor user interface further comprises a video feed and the display module displays a play/pause button, wherein selection of the play/pause button pauses the animation effect and the video feed at a first frame or plays the animation effect and the video feed from the first frame.

13. The method of claim 12, further comprising, while the animation effect is paused at the first frame:
   receiving the user input corresponding to the modification to the editor value;
   modifying the editor value based on the user input;
   synchronizing the modified editor value with the engine value;
   generating the processed animation value based on the synchronized engine value;
   synchronizing the processed animation value with the runtime value; and
   displaying the runtime value in the display module.

14. The method of claim 13, wherein the display module further displays the bindable property, a value associated with the bindable property, and an edit option, wherein:
   the value is set to the editor value if the bindable property is designated as unbound; and
   the value is set to the engine value if the bindable property is designated as bound.

15. The method of claim 14, wherein the display module receives the user input via the edit option if the bindable property is designated as unbound, and the display module disables the edit option if the bindable property is designated as bound.

16. The method of claim 12, further comprising, after completion of a migration, triggering a system event that starts the animation effect from the first frame.

17. One or more non-transitory computer-readable storage media embodying software that is operable when executed by a server computing device to:
   generate an editor user interface, wherein the editor user interface comprises:
      an editor module that comprises an editor model, wherein the editor model comprises an editor value corresponding to a bindable property associated to an animation effect; and
      an engine module that comprises an engine model, wherein the engine model comprises an engine value corresponding to the bindable property;
   receive user input corresponding to a modification of the editor value;
   modify the editor value based on the user input;
   continuously synchronize the modified editor value with the engine value;
   generate a processed animation value based on the synchronized engine value; and
   modify the animation effect based on the processed animation value.

18. The one or more non-transitory computer-readable storage media of claim 17, wherein the software is further operable when executed to:
   display an animation effect in a display module associated with the editor user interface;
   synchronize the processed animation value with a runtime value, wherein the editor module further comprises the runtime value; and
   output the runtime value in the display module while the animation effect is displayed.

19. A system comprising:
   one or more processors; and
   one or more computer-readable non-transitory storage media coupled to one or more of the processors and comprising instructions operable when executed by one or more of the processors to cause the system to:
      generate an editor user interface, wherein the editor user interface comprises:
         an editor module that comprises an editor model, wherein the editor model comprises an editor value corresponding to a bindable property associated to an animation effect; and
         an engine module that comprises an engine model, wherein the engine model comprises an engine value corresponding to the bindable property;
      receive user input corresponding to a modification of the editor value;
      modify the editor value based on the user input;
      continuously synchronize the modified editor value with the engine value;
      generate a processed animation value based on the synchronized engine value; and
      modify the animation effect based on the processed animation value.

20. The system of claim 19, wherein the processors are further operable when executing the instructions to:
   display an animation effect in a display module associated with the editor user interface;
   synchronize the processed animation value with a runtime value, wherein the editor module further comprises the runtime value; and output the runtime value in the display module while the animation effect is displayed.

* * * * *